(No Model.)  3 Sheets—Sheet 1.
D. D. ELLIS.
COTTON CHOPPER, SCRAPER, AND CULTIVATOR.
No. 427,061.  Patented May 6, 1890.
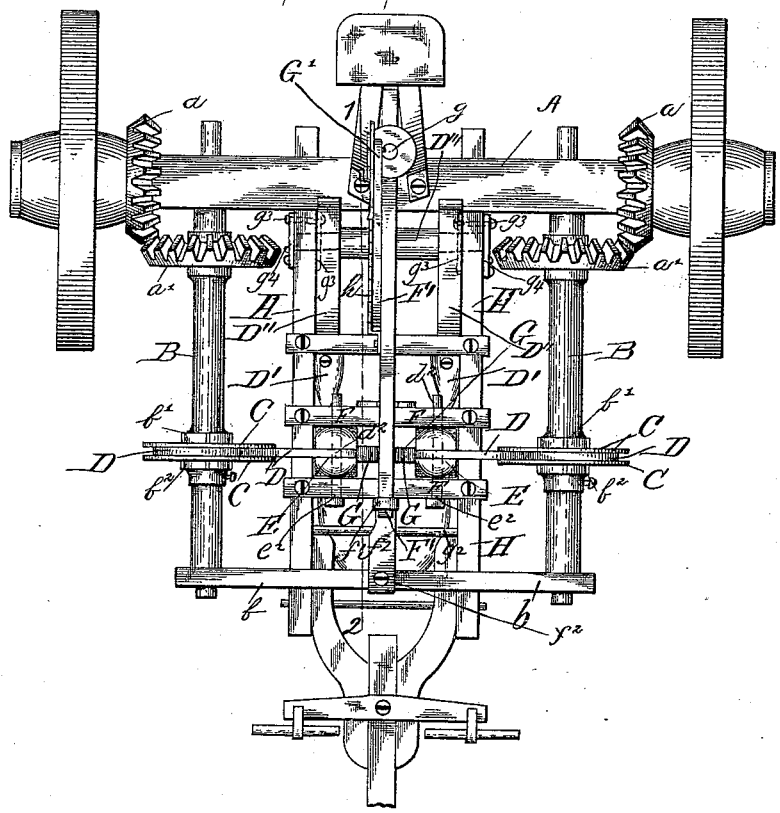
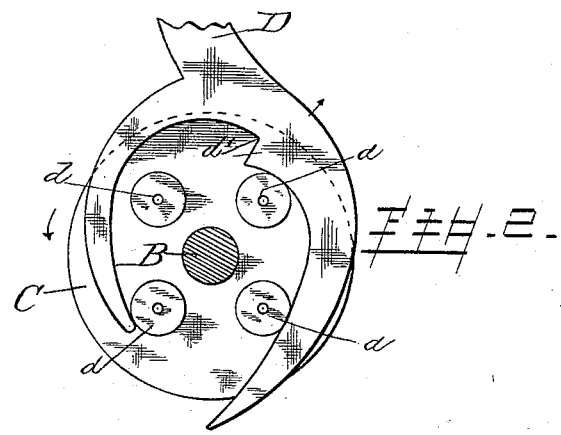
Witnesses
Albert B. Blackwood
Jos H Blackwood
Inventor
David D. Ellis
By his Attorneys
Jas H McBride (No Model.) 3 Sheets—Sheet 2.
D. D. ELLIS.
COTTON CHOPPER, SCRAPER, AND CULTIVATOR.
No. 427,061. Patented May 6, 1890.
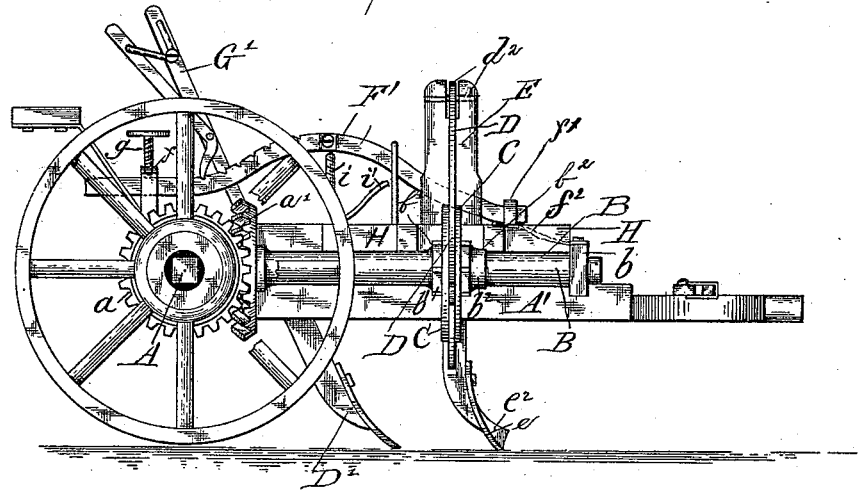
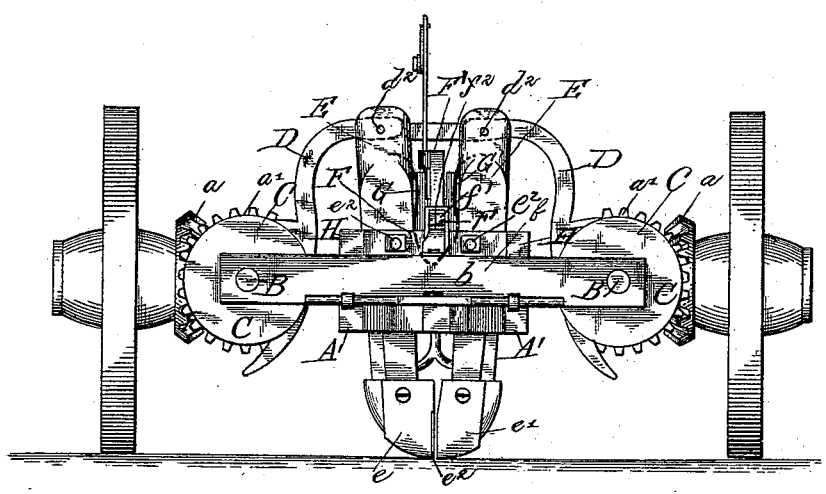

(No Model.) 3 Sheets—Sheet 3.
D. D. ELLIS.
COTTON CHOPPER, SCRAPER, AND CULTIVATOR.
No. 427,061. Patented May 6, 1890.
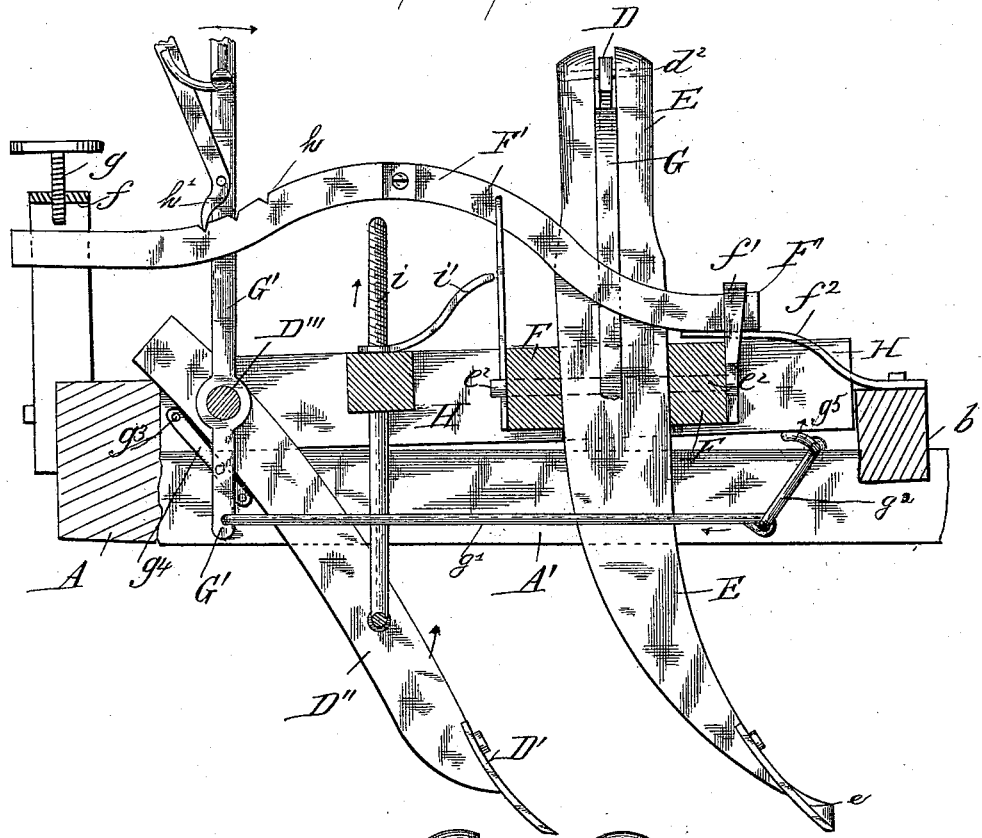
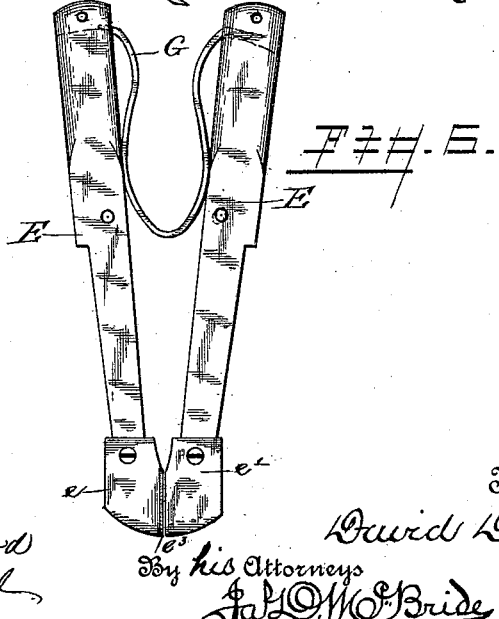
Witnesses
Albert P. Blackwood
Jos H Blackwood
Inventor
David D. Ellis
By his Attorneys
Jas. L. McBride

UNITED STATES PATENT OFFICE.

DAVID D. ELLIS, OF WILL'S POINT, TEXAS.

COTTON CHOPPER, SCRAPER, AND CULTIVATOR.

SPECIFICATION forming part of Letters Patent No. 427,061, dated May 6, 1890.

Application filed December 30, 1889. Serial No. 335,353. (No model.)

*To all whom it may concern:*

Be it known that I, DAVID D. ELLIS, a citizen of the United States of America, residing at Will's Point, in the county of Van Zandt and State of Texas, have invented certain new and useful Improvements in Cotton Choppers, Scrapers, and Cultivators, of which the following is a specification, reference being had therein to the accompanying drawings.

My invention relates to a combined cotton scraper, chopper, and cultivator; and it consists, first, in mechanism hereinafter to be described, by which lateral motion is imparted to the choppers and scrapers; second, in means hereinafter to be described, by which the scrapers and choppers may be raised, in order to leave standing such of the growth of the cotton as is necessary, or while turning corners; third, in means hereinafter to be described, by which the depth at which the scrapers and choppers run into the ground may be adjusted.

In the accompanying drawings, Figure 1 represents a top plan view of my improved cotton scraper, chopper, and cultivator. Fig. 2 is a detail view of one of the actuating-levers, one of the circular disks being removed. Fig. 3 is a side view of the machine; Fig. 4, an end view from the front; Fig. 5, a side elevation on line 1 2, Fig. 1. Fig. 6 is a detail side view of the pivoted standards which carry the scraper and cutter knives.

A represents the axle, to which is secured beveled gear-wheels $a\ a$, which mesh with gear-wheels $a'\ a'$, secured to shafts B B at right angles to the axle A, having one of their ends mounted within bearings in the said axle and their other and remaining ends mounted within a cross-bar $b$, connecting the front ends of the sills A' A', which sills are rigidly attached to the axle at their rear ends, as shown. Rigidly secured to said shafts B B are circular disks or plates C C, arranged in pairs on the shafts B B, held in position thereon by means of a boss $b'$ on one side and an adjustable clamp $b''$ on the other. Pivoted between the said circular disks C C, in a circle concentric to the axis of the shafts B B, are anti-friction and actuating rollers $d\ d$. (Shown in detail in Fig. 2.)

Stirrup-levers D D, provided with notches $d'\ d'$, have their upper extremities bent, so as to be adapted for coupling at $d''\ d''$ with the upright standards E E, to the lower ends of which are secured the scraper and cutter knives $e$ and $e'$, said standards being pivoted at $e''$ to the cross-bars F of a rock-frame H, to be hereinafter described. The stirrups of the levers D D, as will be seen by reference to Fig. 2, ride on the anti-friction rollers $d\ d$, and owing to their formation impart reciprocating motion to the standards E E in one direction, while an interposed spring G causes them to resume their former position. The notches $d'\ d'$ engaging with one of the rollers $d$ prevents the machine from operating on a backward motion.

The scraper and cutter knives $e$ and $e'$ are slightly concaved, the knife $e$ being provided with a flange $e''$, which serves as a plate, against which the plant is cut by the knife $e'$.

A reach-bar F' has one of its ends loosely fitted within the slot formed in the arbor-piece $f$ and its other held within the collar $f'$. A spring-piece $f''$, which is secured at one end to the cross-piece $b$ and has its other end extending into collar $f'$ under the end of reach-bar F', presses upwardly upon the latter. A set-screw $g$ is provided, by which the depth at which the scrapers are to run into the ground may be regulated.

Secured to the lower end of a lever G', which is pivoted to rod D''', that is secured to rock-frame H, is a rod $g'$, Fig. 5, which is coupled to a bell-crank lever $g''$, journaled in the sills A' A', and provided with double arms $g^5$, which impinge against the under side of the rock-frame H, which is located immediately above the sills A' A', and which is pivoted at $g^3$ to arms $g^4$, secured rigidly to the sills A' A' at their rear ends. A ratchet $h$ and dog $h'$ are also provided. By means of lever G', the rod $g'$, and bell-crank lever $g^2$ the frame H, to which is attached the standards E E, may be raised, and thus the scrapers and cutters are raised out of the ground when it is desired to jump or leave standing certain growth or to turn a corner. It will also be seen from the construction of the stirrup-levers D D and the relative position of the anti-friction rollers $d\ d$ that by the removal of one of said rollers the scraper and cutter knives will be separated still farther or opened apart wider, thus leaving more of the cotton standing, so this separation will be increased to a still greater extent by the removal of still another of said rollers, and also to a greater extent by still another.

The machine may be transformed, if desired, into a cultivator by removing the spring G, the scrapers and cutters e and e', and attaching in lieu thereof ordinary shovel-plows. The spring G may then be adjusted reversely so as to hold the plows apart, the beams E E having been adjusted wider apart and rigidly secured in place. By means of the screw i, which connects with the lower ends of the plow-standards D'' and handle i', the plows D', whose standards D'' are pivoted on rod D''', may be raised or lowered.

Having thus described my invention, what I claim as new therein, and desire to secure by Letters Patent, is—

1. The combination, in a combined cotton scraper, chopper, and cultivator, of gear-wheels secured to the wheel-shafts, carrying gear-wheels meshing with the former, circular disks secured to said shafts and having pivoted between them anti-friction and actuating rollers, and stirrup-levers transmitting a reciprocating motion to the upright beams, substantially as described.

2. In a combined cotton scraper, chopper, and cultivator, bifurcated stirrup-levers so formed as that by the removal of one or more of anti-friction or actuating rollers the stroke of said levers may be increased, substantially as set forth.

3. The combination of a reach-bar and spring-piece under one of its ends, and an arbor and set-screw at its other end, by means of which the depth at which the knives e e' are to run into the ground may be regulated.

4. The combination of a pivoted frame, to which are secured the upright beams carrying the knives, a hand-lever and connecting-rod, and a bell-crank lever for raising the knives out of the ground.

In testimony whereof I affix my signature in presence of two witnesses.

DAVID D. ELLIS.

Witnesses:
W. J. GREER,
B. W. BRUCE.